3,544,579
SUBSTITUTED PHENYLCARBAMIC ACID ESTERS
OF CYCLIC AMINO ALCOHOLS
Johan Richard Dahlbom, Sodertalje, and John Lars Gunnar Nilsson, Marsta, Sweden, assignors to Aktiebolaget Astra, Sodertalje, Sweden, a company of Sweden
No Drawing. Filed Feb. 28, 1968, Ser. No. 708,758
Claims priority, application Sweden, Mar. 9, 1967, 3,307/67
Int. Cl. C07d 29/26
U.S. Cl. 260—294.3                          3 Claims

ABSTRACT OF THE DISCLOSURE

A new class of carbamates is disclosed which carbamates constitute substituted phenylcarbamic acid esters of N-alkyl-substituted cyclic amino alcohols. The compounds are useful as local anesthetics. Methods of synthesis and evaluations of local anesthetic properties are described.

---

The present invention relates to substituted phenylcarbamic acid esters of cyclic amino alcohols and their salts and also a process for their preparation as well as pharmaceutical preparations thereof.

More particularly the present invention relates to compounds of the formula

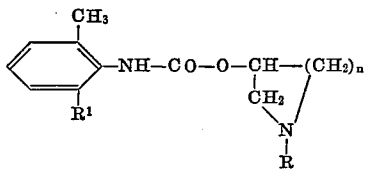

wherein R is a lower alkyl group, $R^1$ is selected from the class consisting of hydrogen, lower alkyl and halogen and n is an integer from 2 to 3, therapeutically acceptable acid addition salts thereof and a process for their preparation. The alkyl groups may be straight or branched and contain at most 5 carbon atoms.

These compounds are novel, stable and possess valuable pharmacological properties, especially they are useful as local anesthetics.

These new compounds may be prepared in different ways, which may be summarized by the following reaction formula

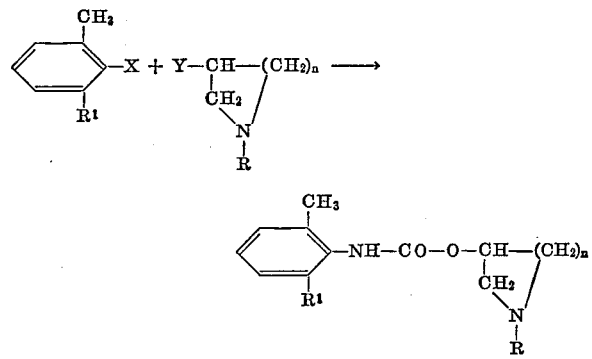

where R, $R^1$ and n have the meaning given above and where X and Y are groups capable of reacting with each other to the formation of the bridge —NH—CO—O— between the two rings.

Examples on different ways of carrying out the present invention are:

(1) Reaction between an isocyanate of the formula

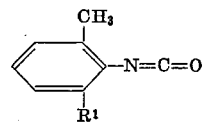

and an alcohol of the formula

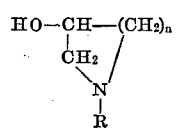

(2) Transesterification of an ester of the formula

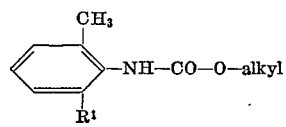

with said alcohol.

(3) Reaction between an acid azide of the formula

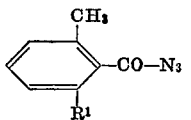

and said alcohol.

(4) Reaction between a carbamic acid chloride of the formula

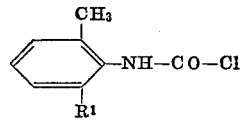

and said alcohol.

(5) Reaction between an amine of the formula

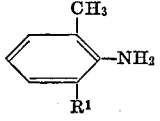

and a chlorocarbonic acid ester of the formula

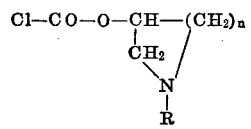

When used as local anesthetics in therapy the compounds according to the present invention are administered in the form of a solution in a pharmaceutical carrier. The concentration is not important and widely varying concentrations are therapeutically effective. Typically solutions may contain from about 0.02% up to a high as about 10% by weight. The compounds according to the invention may be administered in the form of other pharmaceutical preparations, such as suspensions, jellies, ointments or bases. In these preparations the compounds may be used in the form of their free bases or as therapeutically acceptable acid addition salts or as both. The expression therapeutically acceptable acid addition salts is recognized in the art to designate an acid addition salt, which is physiologically innocuous when administered in a dosage and at an interval (i.e. frequency of administration) that is effective for the indicated therapeutic use of the parent compound.

Typical therapeutically acceptable acid addition salts of the compounds of the present invention include but are not limited to the salts of mineral acids, such as hydrochloric, hydrobromic, phosphoric or sulphuric acid, organic acids such as acetic, glycolic, lactic, levulinic acid, acetic, fumaric, maleic, succinic, tartaric, benzoic and cinnamic acids and sulphonic acids, such as methane sulphonic and sulphamic acid.

As is well known in the art, solutions of local anesthetics may be made isotonic by the addition of i.a. sodium chloride. Furthermore it is known in the art of local anesthesia, the anesthesia effectiveness may be improved by addition of a vascoconstrictor, such as adrenaline, noradrenaline or octapressin.

The amount of local anesthestic which may be used varies widely and is well known depending upon the location and type of anesthesia required. The anesthetic effect, according to the present invention, is induced by applying an amount of substituted phenylcarbamic acid ester of cyclic amino alcohols of the present invention which is effective to produce the desired anesthesia.

Repeated applications at therapeutically effective intervals may be made, if desired, to obtain a prolonged anesthetic effect.

The valuable pharmacological properties of the compounds of the present invention and their physiologically acceptable addition salts are demonstrated in the following table, wherein the local anesthetic effect of some of the new compounds is given in comparison with lidocaine. The relative effect of lidocaine=1.0.

TABLE 1

| | | | Local anesthetic effect | | |
|---|---|---|---|---|---|
| $R^1$ | R | n | Blocking of conduction in isolated frog nerve | Surface anesthetic effect on rabbit cornea | Toxicity in mice, i.v. $LD_{50}$ mg./kg. |
| Cl | $C_2H_5$ | 2 | 1–1.5 | 4.1 | 21 |
| $CH_3$ | $C_3H_7$-n | 2 | 2 | 3.6 | 17 |
| Cl | $C_3H_7$-n | 2 | 1.5–2 | 4.5 | 14 |
| $CH_3$ | $C_3H_7$-i | 2 | 1.5 | 2.8 | 22 |
| Cl | $C_3H_7$-i | 2 | 1.5–2 | 4.0 | 14 |
| $CH_3$ | $C_4H_9$-t | 2 | 1.5 | 10.0 | 12 |
| Cl | $C_4H_9$-t | 2 | 1.5–2 | 4.9 | 10 |
| $CH_3$ | $CH_3$ | 3 | 1–1.5 | 3.0 | 15 |
| Cl | $CH_3$ | 3 | 4–4.5 | 4.0 | 14 |
| H | $C_2H_5$ | 3 | 0.7 | 1.0 | 34 |
| $CH_3$ | $C_2H_5$ | 3 | 1.5–2 | 2.8 | 14 |
| Cl | $C_2H_5$ | 3 | 4–4.5 | 6.7 | 14 |
| $CH_3$ | $C_3H_7$-n | 3 | 1.5–2 | 3.2 | 9 |
| Cl | $C_3H_7$-n | 3 | 4–4.5 | 4.8 | 12 |
| $CH_3$ | $C_3H_7$-i | 3 | 1.5–2 | 3.2 | 13 |
| Cl | $C_3H_7$-i | 3 | 4–4.5 | 4.8 | 11 |
| $CH_3$ | $C_4H_9$-t | 3 | 3.5–4 | 5.1 | 7 |
| Cl | $C_4H_9$-i | 3 | 3.5–4 | 6.2 | 5 |
| $CH_3$ | $C_4H_9$-n | 3 | 2 | 2.9 | 9 |
| Cl | $C_4H_9$-n | 3 | 2 | 4.7 | 7 |

The process according to the present invention is illustrated by the following examples.

EXAMPLE 1

4.65 g. of 2-chloro-6-methylphenylisocyanate were added to a solution of 4 g. N-t-butyl-3-hydroxypyrrolidine in 75 ml. of dry toluene and the solution was refluxed for 2 hours. After cooling the solution was washed with 2× 25 ml. of water and extracted with 2× 25 ml. of 2 M hydrochloric acid. The acid extract was made alkaline with soda solution and the precipitated base was extracted with chloroform. After evaporation of solvent in vacuo the crystalline residue was purified by recrystallization from ligroine. The pure product, N-t-butyl-3-pyrrolidyl 2-chloro-6-methylphenylcarbamate, melts at 108–109° C.

The following compounds may be prepared in an analogous way:

N-ethyl-3-pyrrolidyl 2,6-dimethylphenylcarbamate; M.P. 57–58.5° C.

N-ethyl-3-pyrrolidyl 2-chloro-6-methylphenylcarbamate; M.P. 54–56° C.

N-n-propyl-3-pyrrolidyl 2,6-dimethylphenylcarbamate; M.P. 77–79° C.

N-n-propyl-3-pyrrolidyl 2-chloro-6-methylphenylcarbamate; 71–72° C.

N-i-propyl-3-pyrrolidyl 2,6-dimethylphenylcarbamate; M.P. 57–58.5° C.

N-i-propyl-3-pyrrolidyl 2-chloro-6-methylphenylcarbmate; M.P. 80–72° C.

N-t-butyl-3-pyrrolidyl 2,6-dimethylphenylcarbamate; M.P. of the hydrochloride 207–208° C.

N-methyl-3-piperidyl 2,6-dimethylphenylcarbamate; M.P. 101–102° C.

N-methyl-3-piperidyl 2-chloro-6-methylphenylcarbamate; M.P. 120–121° C.

N-ethyl-3-piperidyl 2-methylphenylcarbamate; M.P. of the hydrochloride 245–246° C.

N-ethyl-3-piperidyl 2,6-dimethylphenylcarbamate; M.P. 83–83.5° C.

N-ethyl-3-piperidyl 2-chloro-6-methylcarbamate; M.P. 83–84° C.

N-n-propyl-3-piperidyl 2,6-dimethylphenylcarbamate; M.P. 75–76° C.

N-n-propyl-3-piperidyl 2-chloro-6-methylphenylcarbamate; M.P. 100–101° C.

N-i-propyl-3-piperidyl 2,6-dimethylphenylcarbamate; M.P. of the hydrochloride 209–210° C.

N-i-propyl-3-piperidyl 2-chloro-6-methylphenylcarbamate; M.P. of the hydrochloride 207–208° C.

N-t-butyl-3-piperidyl 2,6-dimethylphenylcarbamate; M.P. 110–111° C.

N-t-butyl-3-piperidyl 2-chloro-6-methylphenylcarbamate; M.P. of the hydrochloride 219–220° C.

N-n-butyl-3-piperidyl-2-chloro-6-methylcarbamate; M.P. 76.5–77.5° C.

N-n-butyl-3-piperidyl-2,6-dimethylphenylcarbamate; M.P. of the hydrochloride 122–124° C.

EXAMPLE 2

0.2 g. of sodium were added to a solution of 12.7 g. of ethyl-2-chloro-6-methylphenylcarbamate and 11.6 g. of N-methyl-3-hydroxypiperidine in 100 ml. of toluene and the reaction mixture was refluxed for 8 hours at which the ethanol formed at the reaction slowly was distilled off. The solution was then washed with water and extracted with 1 N hydrochloric acid. The extract was made alkaline with sodium carbonate and the oily reaction product thereby precipitated was extracted with ether. On evaporation of the ether N-methyl-3-piperidyl 2-chloro-6-methylphenylcarbamate was obtained in crystalline form. After recrystallization from a mixture of ethanol and petroleum ether the product was melting at 120–121° C.

EXAMPLE 3

A solution of 6.0 g. of o-toluyl azide and 6.5 g. of N-methyl-3-hydroxypiperidine in 50 ml. of dry benzene was refluxed for 2 hours. The solution was then washed twice with 50 ml. of water in order to remove excess amino alcohol and extracted with 2× 50 ml. of 2 N HCl. The acid extract was made alkaline with sodium carbonate solution and then extracted with chloroform. After drying over sodium sulphate the chloroform was evaporated in vacuum. The residue, a slowly crystallizing oil, was purified by recrystallization from ligroin. The pure product, N-methyl-3-piperidyl 2-methylphenylcarbamate, melts at 92–93° C.

EXAMPLE 4

4.9 g. of 2,6-dimethylaniline and 3.2 g. of pyridine were added while chilling in ice to a solution of 4.0 g. of phosgene in 100 ml. of toluene. The reaction mixture was kept at 0° C. for 5 hours, whereafter 150 ml. of cold 2 M hydrochloric acid were added. The toluene phase was separated off and dried over calcium chloride. To the solution of 2,6-dimethylcarbamic acid chloride obtained were added 7.8 g. of N-ethyl-3-hydroxypiperidine and the solution was refluxed for 2 hours. After cooling the toluene solution was worked up as described in Example 1. The product, N-ethyl - 3 - piperidyl 2 - 6 - dimethylphenylcarbamate, was purified by recrystallization from ligroin and melts at 83–83.5° C.

EXAMPLE 5

2.8 g. of phosgene was added while chilling with ice to a solution of 4 g. of N-n-propyl-3-hydroxypiperidine in 100 ml. of chloroform. The reaction mixture was left at 0–5° C. while stirring, whereafter 3.4 g. of 2,6-dimethylaniline and 6 g. of triethylamine were added to the solution obtained containing the hydrochloride of N-n-propyl-3-hydroxypiperidine chlorocarbonic acid ester. The solution was refluxed for 4 hours, whereafter the solvent was distilled off. The residue was dissolved in water and the water solution was made alkaline with sodium carbonate solution. The base precipitated, N-n-propyl-3-piperidyl 2,6-dimethylphenylcarbamate, was extracted with ether. The ether solution was washed with water in order to remove triethylamine and dried over sodium sulphate. After evaporation of the solvent the residue was purified by recrystallization from petroleum ether. M.P. 75–76° C.

We claim:
1. A compound of the formula

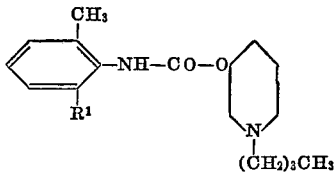

I and therapeutically acceptable acid addition salts thereof, wherein $R^1$ is selected from the group consisting of chlorine and methyl.

2. A compound according to claim 1, wherein $R^1$ is methyl, and therapeutically acceptable acid addition salts thereof.

3. A compound according to claim 1, wherein $R^1$ is chlorine, and therapeutically acceptable acid addition salts thereof.

References Cited

UNITED STATES PATENTS

| 2,762,842 | 9/1956 | Hafliger et al. | 260—553 |
| 3,103,515 | 9/1963 | Zaugg et al. | 260—292 |

FOREIGN PATENTS

| 717,212 | 10/1954 | Great Britain. |
| 717,213 | 10/1954 | Great Britain. |
| 717,214 | 10/1954 | Great Britain. |
| 770,129 | 3/1957 | Great Britain. |
| 772,807 | 4/1957 | Great Britain. |
| 576,421 | 5/1959 | Canada. |

OTHER REFERENCES

Dahlbom et al., Acta Chem. Scand. II, 1350–4 (1957).
Hutton et al., J. Org. Chem. 20, 808–12 (1955).
Sekera et al., Experientia II, 275–6 (1955).
Sekera et al., Arch. Pharm. 291, 122–5 (1958).

HENRY R. JILES, Primary Examiner

G. T. TODD, Assistant Examiner

U.S. Cl. X.R.

260—293.4, 294, 326.3; 424—267